United States Patent

Sandell et al.

(10) Patent No.: US 9,967,321 B2
(45) Date of Patent: May 8, 2018

(54) MEME DISCOVERY SYSTEM

(71) Applicants: Nils F. Sandell, Somerville, MA (US); Nicholas J. Pioch, Woburn, MA (US); Eric K. Jones, Belmont, MA (US)

(72) Inventors: Nils F. Sandell, Somerville, MA (US); Nicholas J. Pioch, Woburn, MA (US); Eric K. Jones, Belmont, MA (US)

(73) Assignee: SYSTEMS & TECHNOLOGY RESEARCH, LLC, Woburn, MA (US)

( * ) Notice: Subject to any disclaimer, the term of this patent is extended or adjusted under 35 U.S.C. 154(b) by 407 days.

(21) Appl. No.: 14/683,990

(22) Filed: Apr. 10, 2015

(65) Prior Publication Data

US 2016/0080476 A1 Mar. 17, 2016

Related U.S. Application Data

(60) Provisional application No. 62/035,634, filed on Aug. 11, 2014.

(51) Int. Cl.
*G06F 15/16* (2006.01)
*H04L 29/08* (2006.01)
*H04W 4/08* (2009.01)
*H04W 4/20* (2018.01)

(52) U.S. Cl.
CPC ............. *H04L 67/10* (2013.01); *H04W 4/08* (2013.01); *H04W 4/206* (2013.01)

(58) Field of Classification Search
CPC ............ H04L 67/10; H04L 67/1076; G06F 17/30598; H04W 4/08; H04W 4/206
See application file for complete search history.

(56) References Cited

U.S. PATENT DOCUMENTS

| 8,429,011 | B2 | 4/2013 | Newton et al. | |
|---|---|---|---|---|
| 2012/0150957 | A1* | 6/2012 | Bonchi | G06F 17/30867 709/204 |
| 2013/0198204 | A1* | 8/2013 | Williams | G06F 17/30283 707/748 |
| 2014/0114978 | A1* | 4/2014 | Chatterjee | G06Q 50/01 707/739 |
| 2014/0164398 | A1* | 6/2014 | Smith | G06F 17/3053 707/748 |
| 2016/0042284 | A1* | 2/2016 | Menczer | G06Q 30/0202 706/46 |

* cited by examiner

*Primary Examiner* — Yves Dalencourt
(74) *Attorney, Agent, or Firm* — Kriegsman & Kriegsman

(57) ABSTRACT

A system for discovering internet memes from a social media stream includes a meme detector for grouping together incoming posts that contain a common set of anomalous terms, the meme detector comparing the frequency of use of the anomalous terms against normalcy models to ensure that the use of the anomalous terms is non-recurring. The system additionally includes a meme tracker for classifying each cluster of related posts as a particular meme and, in turn, associating new related posts from the media stream with the classified cluster. In this manner, the particular set of anomalous terms used to classify each meme can be augmented to include other discriminating terms. Accordingly, the parameters, or features, associated with each meme are continuously monitored and refined, as needed, to ensure that the most comprehensive and reflective cluster of posts for each meme is collected from the social media stream in an efficient fashion.

11 Claims, 5 Drawing Sheets

MEME DISCOVERY SYSTEM

STATEMENT REGARDING FEDERALLY SPONSORED RESEARCH OR DEVELOPMENT

This invention was made with government support under Contract No. W911NF-12-C-0043 awarded by the Defense Advanced Research Projects Agency (DARPA). The government has certain rights in the invention.

FIELD OF THE INVENTION

The present invention relates generally to the field of social media analytics and more particularly to the automated discovery of viral content from social media sources.

BACKGROUND OF THE INVENTION

Social media are computer-based tools, such as websites and applications, which enable content to be created and shared amongst an audience via the internet. The types of content available through typical social media outlets can vary, but most commonly are either text-based (e.g. status updates and commentary) or image-based (e.g. videos and photographs) in nature.

A microblogging service is one form of social media that has grown considerably in prominence. For instance, the TWITTER social networking service is a well-known microblogging service that enables users to send and read relatively short text-based messages. Currently, microblogging participants include both passive users who mainly follow high volume content generators, such as celebrities and news organizations, and active users who use social media to, inter alia, engage in discussions and rally support for causes.

The growth in popularity of microblogging services has resulted in expanded uses of its content. In particular, the rapid expansion of microblogging services is proficiently used in the commercial world to support targeted advertising (i.e. advertising to designated audiences). An example of targeted advertising achieved using content found through social media streams is described in U.S. Pat. No. 8,429,011 to C. D. Newton et al., the disclosure of which is incorporated herein by reference.

To optimize the use of content from social media in the commercial world, data analytics are commonly employed to parse text streams and identify one or more terms of interest. Through such use of data analytics, internet memes are commonly discovered.

An internet meme, or meme, is defined generally as a transient concept, topic or event (e.g. a catchphrase or activity) captured in an electronic medium that is shared rapidly amongst an audience via the internet. Often referred to as "viral" media, memes are largely discovered en masse through conventional social media streams and have a lifespan on the order of several hours to a week.

The application of effective analytics on social media content to discover relevant memes is essential in the early detection of emerging patterns and novel content. However, the ability to effectively discover memes is rendered difficult due to not only the rapid increase in the number of prominent social media sources but also the commensurate rise in the number of regularly active microbloggers (with certain microblogging services exceeding 200 million active monthly users) who generate a continuous stream of posts on a broad range of topics. As a result, the search for relevant content amidst the noise inherent in such a prohibitively large volume of largely irrelevant data has been found to be highly challenging.

For text-based social media streams, the discovery of memes is often achieved using basic word detection search algorithms. For instance, microblogging anomalies (i.e. the unusually excessive usage of a set of one or more terms) are often detected using tools provided by the social media source which simply count the frequency that a particular set of terms appears within the data stream within defined period of time. If the term exceeds a particular threshold or is comparatively large, the trending term set is identified as a meme.

Traditional techniques for discovering text-based memes through the detection of semantically matched posts have been found to suffer from a few notable drawbacks.

As a first drawback, traditional meme discovery techniques are not always effective in identifying new, relevant and notable memes. Specifically, it has been found that certain trending terms are largely recurrent and, as a consequence, may be less relevant than certain new, previously unidentified trending terms. For instance, lunch-related memes occur at midday on a daily basis and, as such, are not typically of particular relevance. At the same time, certain less prevalent, yet potentially novel and notable, anomalies may be occurring but are rendered difficult to identify due to the presence of these commonly occurring microbursts. As a consequence, trending memes of notable significance may be effectively hidden by larger-scale, commonly reoccurring memes of lesser significance. This often results in an unacceptable delay in identifying trending memes of particular significance (i.e. after the meme has already achieved viral status) rather than identifying such memes at an early stage (e.g. after just a few tweets).

As a second drawback, traditional meme discovery techniques which rely upon the identification of semantically matched posts are ineffective in locating all posts that relate to a common concept. In other words, two related posts that utilize distinct yet synonymous terms (e.g. eat and dine) are not commonly categorized using traditional meme discovery techniques. So, although such tools can help a user identify semantically matched posts, the results give only a limited indication of what ideas or concepts are currently being discussed and shared. As a result, effective identification of all posts relating to a particular meme is not readily obtainable.

As a third drawback, traditional meme discovery techniques rely upon basic algorithmic constructs which tend to execute in a slow and inefficient manner. As can be appreciated, it is generally desirable to identify memes as early as possible for a wide variety of reasons, such as targeted marketing or other commercial purposes. Consequently, the relatively slow speed associated with traditional meme discovery techniques often necessitates that inspection of a relatively large data feed be limited to a small subsection thereof.

As a fourth drawback, traditional meme discovery techniques are ineffective in determining, evaluating and reconfiguring the duration of the anomaly detection period to be utilized. In other words, if too short a period of time is utilized to evaluate the presence of anomalies, slower forming memes (i.e. memes with less of a burst) will be difficult to identify. By contrast, if too large a period of time is utilized to determine the presence of anomalies, the timeliness of the meme discovery process can be significantly compromised.

SUMMARY OF THE INVENTION

It is an object of the present invention to provide a new and improved system for discovering memes contained within a social media stream.

It is another object of the present invention to provide a system as described above that rapidly and efficiently detects memes contained within a comprehensive and unfettered social media stream that produces a relatively large quantity of content.

It is yet another object of the present invention to provide a system as described above that is adapted to filter out selected recurrent memes of limited relevance.

It is still another object of the present invention to provide a system as described above that is adapted to detect memes from related but semantically distinct posts contained in the social media stream.

Accordingly, as one feature of the present invention, there is provided a system for discovering internet memes from a social media stream generating a plurality of posts, each post comprising at least one term, the system comprising (a) a meme detector for grouping together a first set of posts from the social media stream, each of the posts in the first set including at least one common term, the meme detector characterizing the first set of posts as an internet meme using the at least one common term, and (b) a meme tracker for classifying the internet meme, the meme tracker continuously monitoring posts from the social media stream and associating additional posts related to the internet meme with the first set of posts to yield a combined set of posts for the internet meme.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE INVENTION

Figure 1:
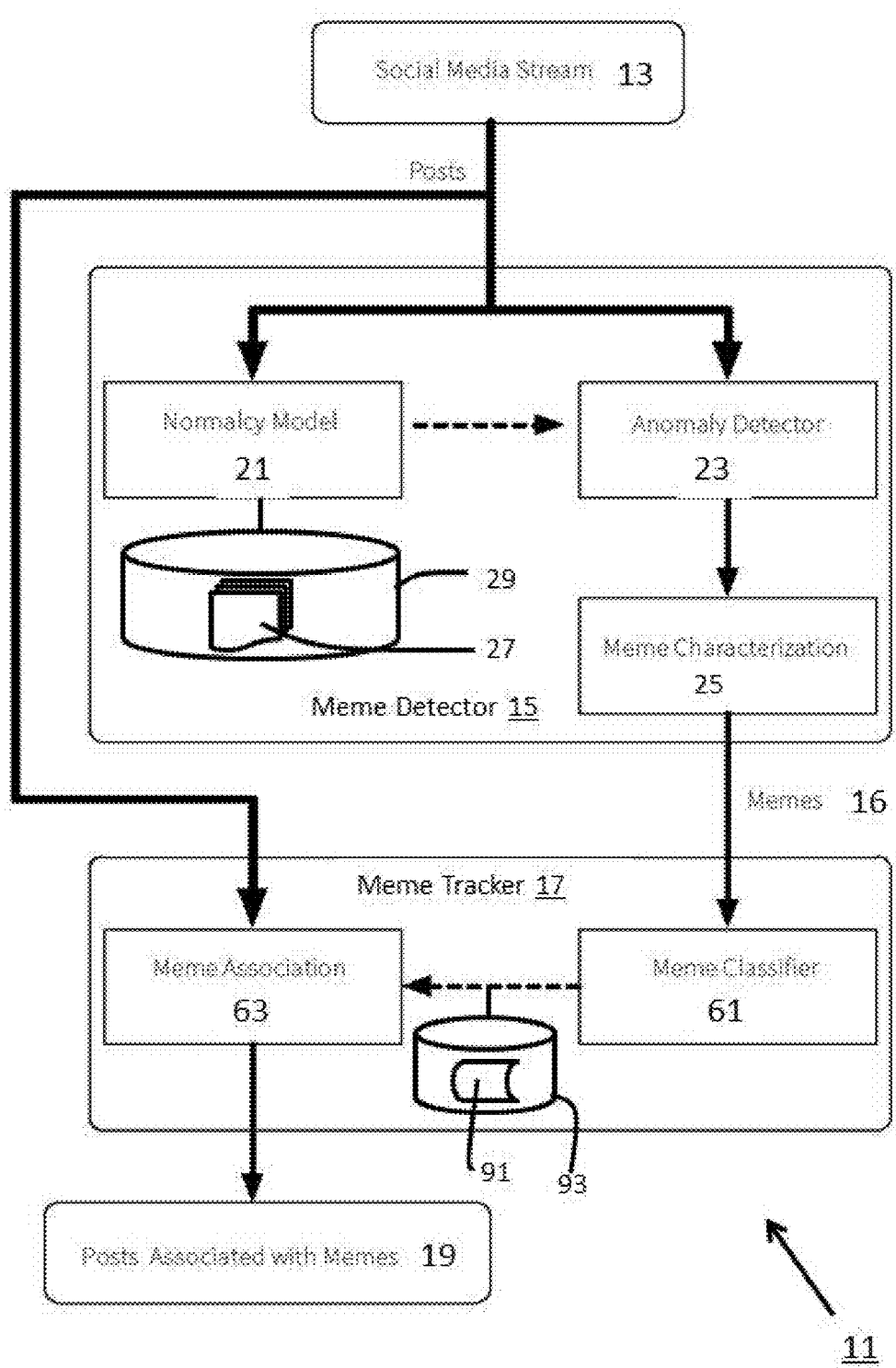
FIG. 1 is a simplified schematic representation of a novel system for discovering memes contained within a social media stream, the system being constructed according to the teachings of the present invention.

Referring now to FIG. 1, there is shown a system for discovering memes contained within a social media stream, the system being constructed according to the teachings of the present invention and identified generally by reference numeral 11. As will be explained further in detail below, system 11 is specifically designed not only to detect of bursts of recurrent terms (i.e. micropatterns) but, more significantly, to detect micropatterns based on deviations against normal, routine behavior. In other words, system 11 evaluates detected anomalies against a normalcy model to yield an optimized, or preferred, set of relevant memes.

In the description that follows, system 11 is shown discovering memes contained within a designated social media stream 13. As defined herein, social media stream 13 represents any continuous, streaming feed of data from at least one social media source. Preferably, media stream 13 includes a high volume of streaming data from the designated social media source (e.g. a feed from the TWITTER social networking service). In particular, to ensure completeness and accuracy in discovering anomalies, media stream 13 preferably represents the entire, unfettered feed from each designated social media source, and not a subset thereof.

For simplicity purposes, system 11 is described in conjunction with the detection of memes that relate to posts or other snippets of text that contain a set of words. However, it should be noted that system 11 is not limited to text-based memes. Rather, it is to be understood that system 11 could be similarly applied to alternative types of memes, such as audio-based or video-based memes tagged with certain features such as text-based identifiers or features inferred from the media, without departing from the spirit of the present invention.

In the description that follows, the discovery of memes is achieved by detecting and tracking bigrams, which are notable word pairs contained within each post (e.g. posts which contain the terms "holiday" and "traffic"). When the frequency of use of certain bigrams exceeds a normalcy threshold, an internet meme is identified and subsequently tracked. However, it should be noted that the system and method of the present invention is not limited to the identification and classification of memes using bigrams (i.e. notable word pairs). Rather, it is to be understood that memes could be identified and classified using an alternative number of notable terms (e.g. unigrams or trigrams) without departing from the spirit of the present invention.

System 11 is constructed as a computer-implemented system that includes a plurality of modules that operate in cooperation to discover new and relevant memes. As can be seen, system 11 comprises (i) a meme detector 15 for identifying a set of relevant, or preferred, memes 16 from social media stream 13, and (ii) and a meme tracker 17 for classifying each relevant meme 16 into a defined category and, in turn, clustering together all past, present and future posts from social media stream 13 that relate to each defined meme category. In this manner, meme tracker 17 is designed to produce, or yield, an all-inclusive cluster, or set, of relevant posts 19 from social media stream 13 that relates to an identified meme.

As can be seen, meme detector 15 and meme tracker 17 concurrently receive the unfettered, high volume, streaming data from social media stream 13. In this manner, system 11 is designed to not only continuously detect new memes from media stream 13 but also associate new posts from media stream 13 with previously detected memes.

It should be noted that social media stream 13 is preferably preprocessed before being delivered concurrently to meme detector 15 and meme tracker 17. Specifically, social media stream 13 preferably undergoes a feature extraction step in which the text body from each post is extracted and then cross-referenced against a predefined stop-word list, or table. If any predefined stop words (e.g. short function words, such as "the," "at," "is," "which, and "on") are identified in the extracted text body, those stop words are filtered out from the post.

For example, a post stating, "I am writing a message," would be preferably converted during the preprocessing stage into a set of principal terms, such as {writing, message}. By representing each post as a limited, concise set of unique words, system 11 is able to identify and track memes in an accelerated fashion, which is critical due to the transitory nature of internet memes.

Meme detector 15 operates at defined intervals to identify memes from social media stream 13. As can be seen, meme detector 15 includes a normalcy model 21 for monitoring media stream 13 to define a historical baseline for certain microbursts (i.e. how often, or normal, certain patterns of terms occur in stream 13 within a particular period of time), an anomaly detector 23 for identifying relevant anomalies based on the information accumulated by normalcy model 21, and a meme characterizer 25 for grouping together related anomalies identified by detector 23 for characterization as a notable meme 16.

As referenced above, normalcy model 21 continuously monitors media stream 13 and compiles historical data on certain terms used in posts into one or more normalcy tables 27 stored in a database 29, with each table 27 relating to a specified interval in time. Normalcy model 21 both receives media stream 13 and operates in parallel with anomaly detector 23. However, it is to be understood that an initial run-up phase would be required to create the normalcy tables 27 that are then cross-referenced by anomaly detector 23 to identify the most relevant anomalies (e.g. anomalies that are not largely recurrent).

As defined previously, a bigram is a unique pair of words or terms that appear together in a post. Normalcy model 21 models the number of times a certain bigram (a,b) occurs within a specific time interval t as a Poisson random variable $X_{a,b,t}$~Poisson ($\theta_{a,b,t}$). Normalcy model 21 also operates under the presumption that bigram counts are independent of each other for a given time interval.

In the present embodiment, time interval t is defined as one hour and the Poisson distribution is completely parameterized by its mean, $\theta_{a,b,t}$. Therefore, an estimated normalcy table 27 for each hour of a day is accumulated by counting the number of unique word pairs that appear together in a post, with counts for each table 27 updated on a daily basis.

Figure 2A:
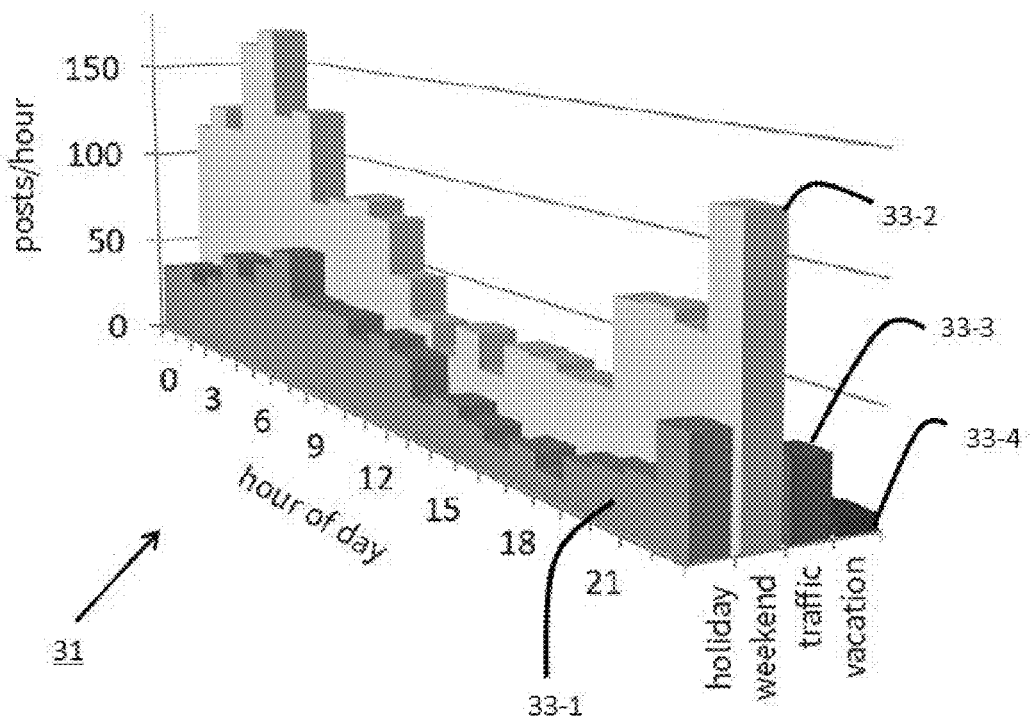
FIG. 2(a) is a count graph for an illustrative set of selected unigrams during a defined period of time.

For illustrative purposes only, a count graph of selected unigrams during a 24-hour period is shown in FIG. 2(a), the count graph being identified generally by reference numeral 31. In the example, count graph 31 depicts the frequency of use of four specified terms (namely, the unigrams "holiday" 33-1, "weekend" 33-2, "traffic" 33-3, and "vacation" 33-4) during each hour of a day.

Figure 2B:
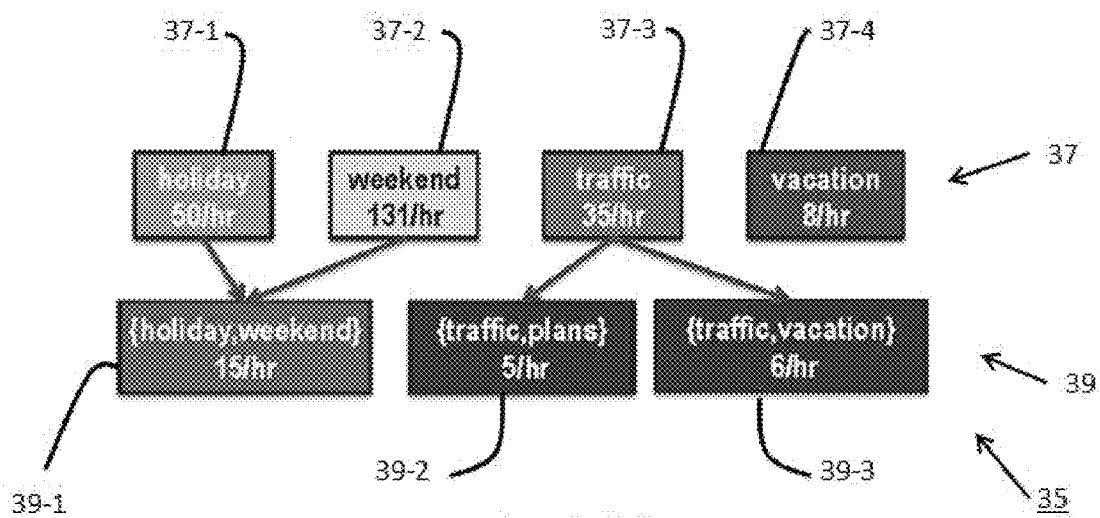
FIG. 2(b) is a directed acyclic graph for the illustrative count graph depicted in FIG. 2(a)

In FIG. 2(b), a directed acyclic graph (DAG) is provided to further index the information contained in count graph 31 into bigram counts, the DAG being identified generally by reference numeral 35. As can be seen, DAG 35 includes a parent level 37 and a child level 39. Parent level 37 includes a plurality of nodes 37-1 thru 37-4 that directly correspond to each unigram 33 in count graph 31. Child level 39 includes a plurality of bigrams 39-1 thru 39-3 that are formed using a corresponding pair of parent nodes 37, each bigram 39 being created only after at least one of its associated parent nodes 37 exceeds a predefined threshold count. In the present example, bigram 39-1 (consisting of the terms "holiday" and "weekend") is found in 15 posts per hour during the defined period, bigram 39-2 (consisting of the terms "traffic" and "plans") is found in 5 posts per hour during the defined period, and bigram 39-3 (consisting of the terms "traffic" and "vacation") is found in 6 posts per hour during the defined period. The aforementioned data is collected and stored in tables 27 to evaluate the normalcy of future posts from media stream 13.

As referenced briefly above, anomaly detector 23 identifies an initial set of posts-of-interest from social media stream 13 based on anomalous word co-occurrence. In other words, if the likelihood of an observed count for a given bigram exceeds a predefined threshold, the bigram is declared anomalous.

Once identified by detector 23, the initial set of anomalies is cross-referenced against normalcy tables 27 stored in database 29 to yield a set of preferred set of anomalies. Stated another way, the initial set of anomalies is compared against historical anomaly data in order to filter out recurrent anomalies, which are typically less significant, and thereby allow for the identification of pertinent memes using only non-recurrent anomalies, which is a principal object of the present invention.

For instance, given a Poisson probability model for a specified time interval, an anomalous bigram count is detected by thresholding a likelihood score. For a bigram (a,b), given an observed count k for a time interval t, the likelihood is:

$$P(X_{a,b,t} = k) = \frac{\theta_{a,b,t}^k e^{-\theta_{a,b,t}}}{k!} \tag{1}$$

The bigram (a,b) is declared anomalous if $P(X_{a,b,t}=k) \leq \alpha$. Equivalently, $$\left[k\log\theta_{a,b,t} - \theta_{a,b,t} - \sum_{j=1}^{k}\log j\right] \leq \log\alpha \Rightarrow \text{anomalous} \tag{2}$$

Figure 3:
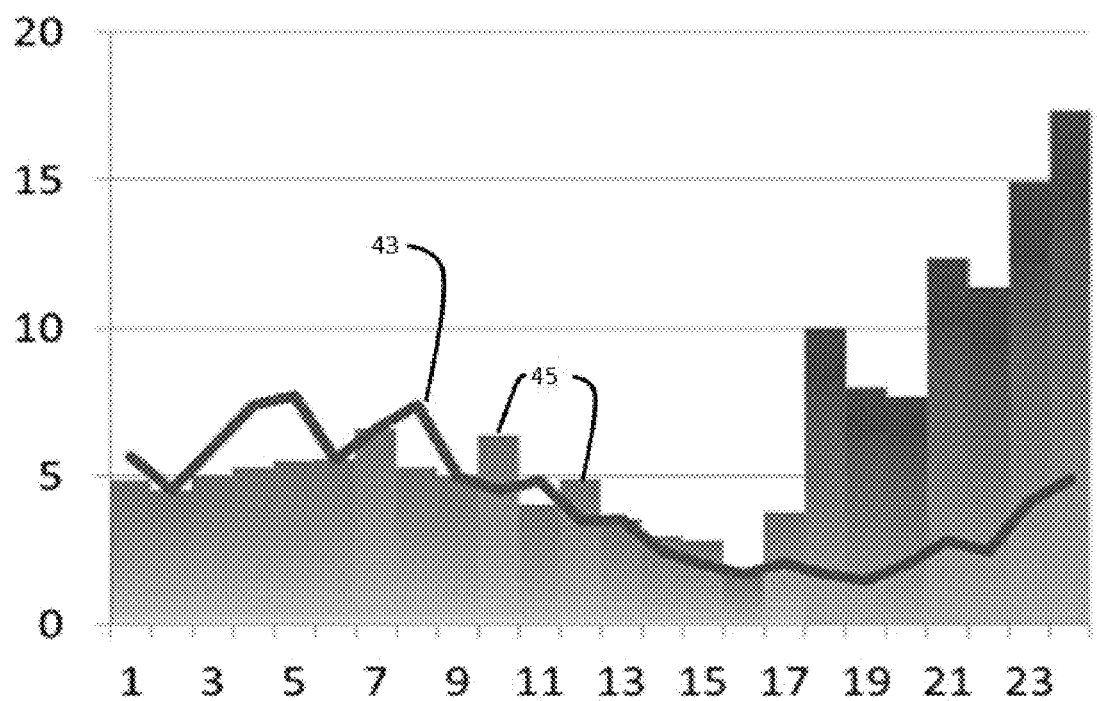
FIG. 3 is chart depicting an illustrative count of a particular bigram in relation to a normalcy model for the bigram during a previous time period.
Figure 3:

It should be noted that to detect anomalies during the current day, the normalcy model estimated using data from the previous day is preferably utilized, the data associated with the previous day normalcy model being stored in database 29 as a particular table 27. Referring now to FIG. 3, there is shown a chart depicting the expected number of counts $\theta_{a,b,t}$ for a particular bigram (a,b) during each one-hour time period t of a day, the chart being identified generally by reference numeral 41. In chart 41, a normalcy curve 43 is defined using the expected number of counts $\theta_{a,b,t}$ for bigram (a,b), as modeled the previous day. Chart 41 additionally includes a series of bars 45 that represents the actual number of observed counts for the bigram (a,b) during the same time periods in the present day. As can be seen, observed counts that exceed normalcy curve 43 by a defined threshold establish the detection of a preferred, or non-recurrent, anomaly (e.g. counts detected during hours 18-24 of chart 41). The anomaly is thus defined as an anomalyof-interest and all posts from media stream 13 that includes the anomalous bigram are delivered to meme characterizer 25 for further analysis.

The aforementioned detection process engaged by anomaly detector 23 is preferably undertaken at fixed intervals that are optimized to ensure completeness as well as timeliness, which is a principal object of the present invention. For instance, it has been determined that a triggering period of 15 minutes may be optimal in detecting emerging trends as close as possible to inception (e.g. minutes after one or more terms repeats within media stream 13 in a shortened period of time) without delaying completion of the overall meme discovery process.

As referenced briefly above, meme characterizer 25 evaluates the anomalies-of-interest identified by detector 23 and, in turn, groups relevant, related posts together to form one or more sets of internet memes 16. In the present embodiment, meme characterizer 25 groups relevant posts into memes by (i) constructing a graphical representation using each anomalous bigram contained within the group of relevant posts, and (ii) locating the most frequent trigrams from the aforementioned graphical representation.

Figure 4:
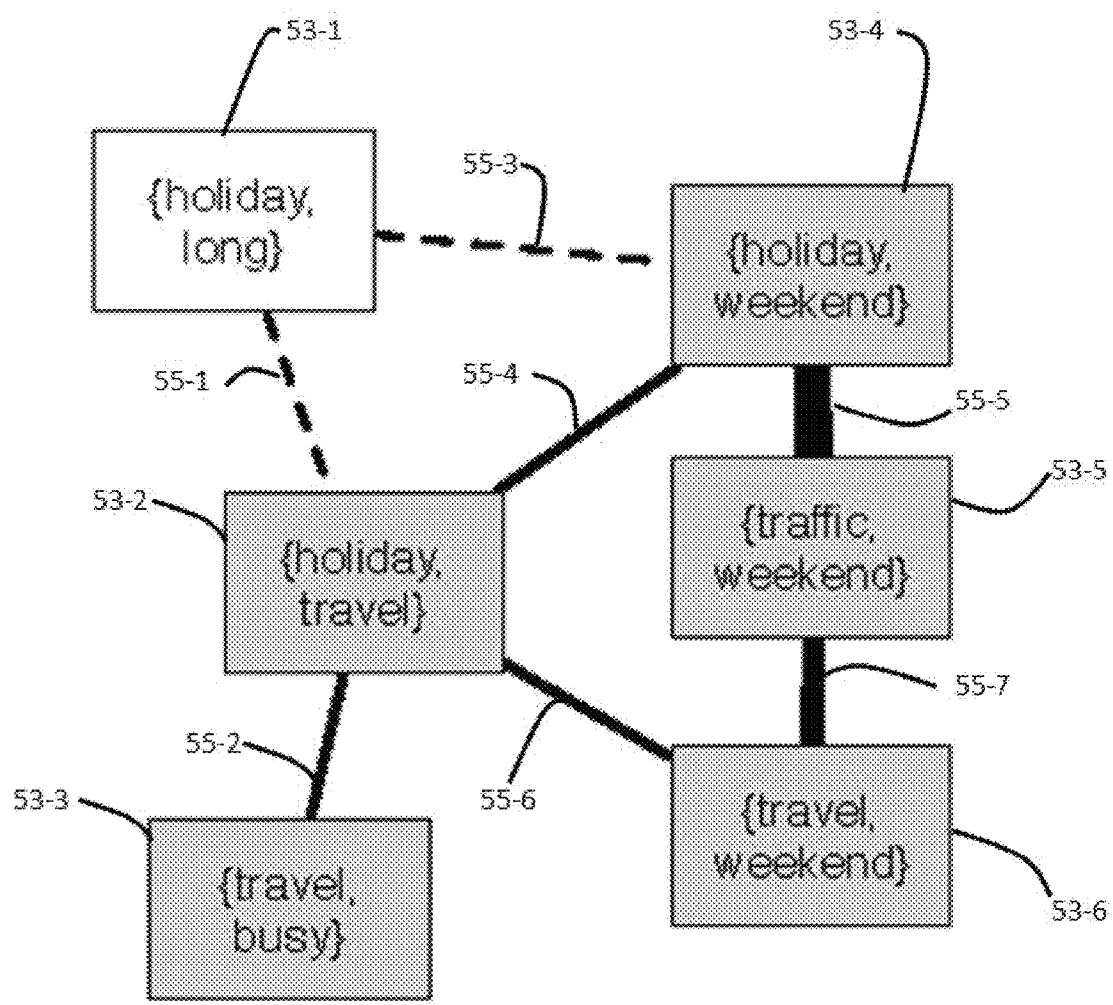
FIG. 4 is a weighted undirected graph that depicts an illustrative group of bigrams for an internet meme, the graph being useful in understanding the principal operation of the meme characterizer in FIG. 1.

For example, referring now to FIG. 4, there is shown a weighted undirected graph relating to a grouping of posts that together form an internet meme, the graph being represented generally by reference numeral 51. As can be seen, graph 51 includes a set of anomalous bigrams 53-1 thru 53-6 that are found in the group of related posts, with each bigram 53 serving as a node in graph 51.

Bigrams 53 are connected by edges 55-1 thru 55-7. As shown, an edge 55 connects a pair of bigrams 53 if the pair of bigrams 53 shares a common term. For instance, bigram 53-1, which includes the terms "holiday" and "long," shares an edge 55-1 with bigram 55-2, which includes the terms "holiday" and "travel," due to common use of the term "holiday."

It should be noted that the weight (i.e. the thickness) of each edge 55 is directly proportional to the number of posts that includes the connected pair of bigrams 53. More particularly, the thickness of each edge 55 is correspondingly increased for each post that includes all three terms in the connected pair of bigrams 53. For instance, the weight of edge 55-1 is increased for every post that includes the terms "holiday," "long," and "travel." In this manner, each edge 55 represents a trigram.

By weighting each edge 55 in the manner set forth above, the most prevalent trigram in the group of related posts can be identified (i.e. the three terms most commonly used in the same post are located). For instance, in the present example, trigram 55-5, which consists of the terms "holiday," "weekend," and "traffic," has the highest count. Once the trigram with the highest count is identified, all posts containing the trigram are grouped together as a trigger set, which is stored in database 29. The collection of posts for each meme 16 is then classified and monitored by meme tracker 17 to identify new, associated posts from media stream 13, as will be explained in further detail below.

After the most prevalent trigram is identified (i.e. trigram 55-5), all the posts associated with the trigram are removed from graph 51. In other words, the weighting of each edge 55 in graph 51 is recalculated in view of the removal of the aforementioned posts from the original grouping. Additionally, any bigrams 53 which are no longer considered anomalous (i.e. any bigrams from the reduced group of posts that does not exceed a predefined threshold) are removed from graph 51. In view of the modified graph, the trigram with the highest count in the revised graph 51 is identified, and all posts containing the trigram are grouped together in database 29 as the trigger set for another meme-of-interest 16.

The aforementioned process is repeated, as needed, until graph 51 is fully disconnected, or the count for the largest remaining edge 55 falls below a predetermined threshold. Referring back to FIG. 1, the output produced from meme characterizer 25 is therefore a set of relevant memes 16, with each meme 16 parameterized by its corresponding trigger set (i.e. the collection of posts directly relating to each meme).

The trigger set for each meme 16 is then received by meme tracker 17 in order to, inter alia, classify each meme and, in turn, associate new, related, incoming posts from media stream 13 with the classified memes. In this manner, meme tracker 17 is designed to produce, or yield, an all-inclusive, continuously updated, cluster of posts 19 from social media stream 13 that relate to a meme 16 previously identified as relevant by meme detector 15.

As can be seen, meme tracker 17 comprises a meme classifier 61 for creating a categorization, or classification, model based on the trigger set for each meme and a meme associator 63 for tracking media stream 13 in view of the classification model and, in turn, associating any new posts relating to the meme with its original trigger set.

In the present embodiment, meme classifier 61 trains, or models, a fast binary classifier for each trigger set that, in turn, can be used by associator 63 to link new, related, incoming posts to each meme. Preferably, meme classifier 61 establishes a binary classifier for each meme using a hybrid of two classification processes: (i) a decision, or classification, tree for quickly filtering out the vast majority of posts from media stream 13 that are unrelated (i.e. irrelevant) to the meme, and (ii) a Naive Bayes classifier to conduct a more intensive (i.e. complex) comparison of features with respect to the remaining (i.e. unfiltered) posts from media stream 13. The utilization of this type of hybrid classification process allows for effective and accurate classification of data in a quick and efficient fashion, which is necessary due to the prohibitively large quantity of posts generated from media stream 13.

Figure 5:
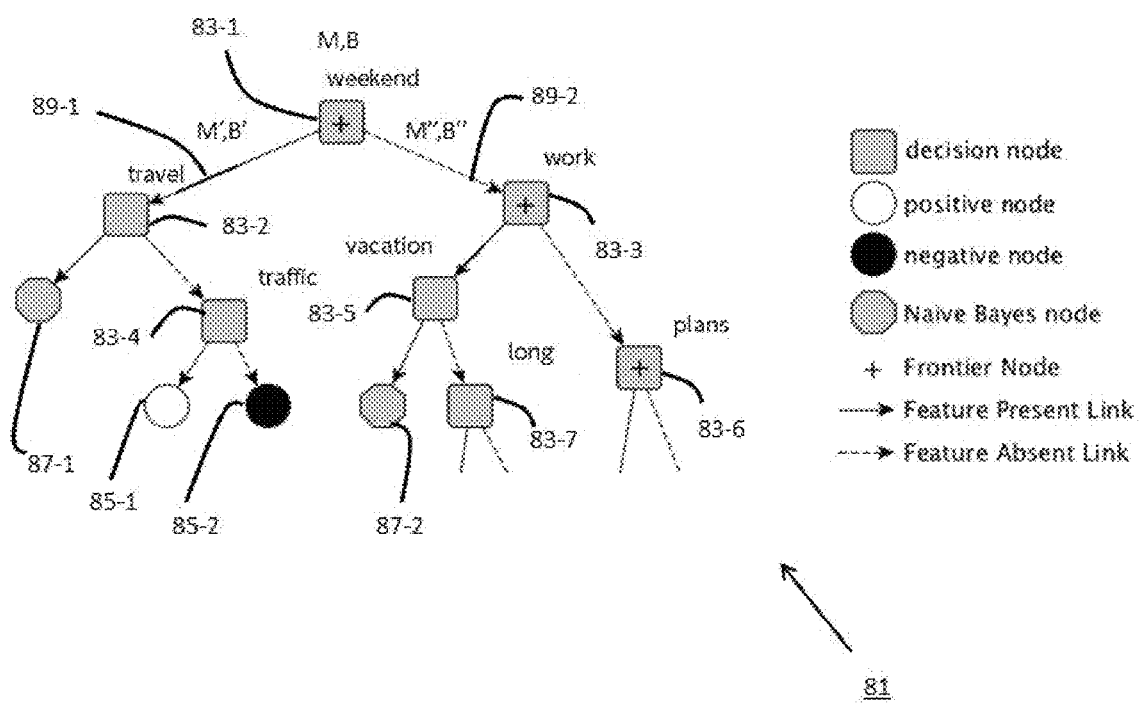
FIG. 5 is a partially formed, illustrative classification tree that is useful in understanding the principal operation of the meme classifier shown in FIG. 1.

Referring now to FIG. 5, there is shown an example of a partially formed, node-based, classification tree that is useful in understanding the classification process of the present invention, the classification tree being identified generally by reference numeral 81. As will be explained further below, classification tree 81 includes (i) fast decision nodes 83-1 thru 83-7 for quickly partitioning the large quantity of data from media stream 13 into smaller, more manageable subsets of data, (ii) terminal leaf nodes 85-1 and 85-2 for selectively classifying entire subsets of data as either positive (i.e. relevant) or negative (i.e. irrelevant) with respect to the meme, and (iii) Naive Bayes nodes 87-1 and 87-2 for conducting a relatively complex comparison of the small fraction of remaining subsets of data to assess relevance with respect to the meme.

In the present embodiment, classification tree 81 is constructed using two distinct sets of modeling data: (i) a background set B consisting of posts that do not directly relate to the meme-of-interest, the posts having been aggregated from media stream 13 over a period of several days during a prior period sufficiently distant from the present (e.g. six months), and (ii) a foreground set M consisting of the posts that form the trigger set for the meme-of-interest, the posts having been previously identified and characterized by meme detector 15. As such, it is to be understood that the background set functions as a negative data set and the foreground set functions as a positive data set.

Classification tree 81 is trained one node at a time in the following manner. If the proportion of the negative set (i.e. background B) relative to the positive set (i.e. foreground M) exceeds a predefined threshold, a decision node 83 is added to classification tree 81 that corresponds to the term most frequently found in the foreground set. In the present example, because the term "weekend" is most prominently utilized in the collection of posts that form the trigger set, a corresponding decision node 83-1 is added to tree 81.

The inclusion of node 83-1 enables the relatively large background set B to be quickly split into background subsets B' and B", which are more manageable for classification modeling. Accordingly, the large background set B is split at node 83-1 such that all posts from media stream 13 that include the term (i.e. subset B') are directed along a feature present branch, or link, 89-1 and all posts from media stream 13 that do not include the term (i.e. subset B") are directed along a feature absent branch, or link, 89-2.

Similarly, foreground set M is split at node 83-1 such that all posts from the trigger set that include the term (i.e. subset M') are directed along feature present branch 89-1 and all posts from the trigger set that do not include the term (i.e. subset M") are directed along the feature absent branch 89-2.

After splitting the positive and negative sets of data in the manner set forth above, the data is, once again, evaluated to determine whether the remaining posts in each background subset relative to the remaining posts in the corresponding foreground subset exceeds the predefined threshold. If the proportion still exceeds the threshold, an additional decision node 83 is added to tree 81 at the end of its corresponding branch 89. The filter for each additional decision node 83 is preferably determined by identifying the most frequently found term from the resulting foreground subset that has not already been utilized in classification tree 81. The process repeats, as necessary, until the proportion along each path no longer exceeds the defined threshold.

If, at any point, decision node 83 partitions data into a subset of posts that is homogenous (i.e. either all negative or all positive), then a corresponding terminal leaf is added. In other words, if every post applied to a decision node 83 is from the foreground set, a positive leaf node 85-1 is extended from the decision node 83 and the path terminates. By contrast, if every post applied to a decision node 83 is from the background set, a negative leaf node 85-2 extends from the decision node 83 and the path terminates.

When the proportion between a background subset relative to its corresponding foreground subset does not exceed the predefined threshold and, in addition, the resulting set is not homogenous, a Naive Bayes node 87 is added to the path. As can be appreciated, each Naïve Bayes node 87 is trained using a Naive Bayes classification model.

Classification tree 81 is trained in the manner set forth above. The process of adding nodes to classification tree 81 ends either upon the inclusion of a leaf node 85 or upon reaching a predefined depth limit. Once completed, classification tree 81 can be used to quickly and efficiently evaluate the relatively large quantity of data from social media stream 13 and locate posts relating to the meme-of-interest.

A key design element of classifier 61 is that the leaf node 85 that is arrived at by the absence of every term starting at the root (number) is always a negative leaf node 85-2. This implies that in order to be classified as belonging to a meme, the post must contain at least one of the terms (designated "frontier terms") on the path from the root node to node (number). As a consequence, one can collect all possible memes a post could possibly be associated with simply by checking the posts' terms against a hash that maps frontier terms to classifiers. This allows the association process to scale to very large numbers of memes, as one does not need to check every post against every meme classifier.

A computer-based algorithm for modeling a classification tree 81 for every detected meme 16 could be implemented using a program of the type set forth in detail below:

Algorithm 1 BFNB training algorithm. M is the set of messages in the meme, B is a set of messages not in the meme, $\gamma$, $\lambda$, $D_{max}$ are scalar parameters that determine the tree growth.

```
 1: function BUILD_BFNB(M, B)
 2:     root = BUILD_BFNB_NODE(M,B,0)
 3: end function
 4:
 5: function BUILD_BFNB_NODE(M, B,D)
 6:     if D > 0 then                                          ▷ Test For base cases.
 7:         if |M| = 0 then                                    ▷ If no meme in this branch, always negative
 8:             return Negative leaf
 9:         else if |B| = 0 then                               ▷ If no background but meme in branch, always positive
10:             return Positive leaf
11:         end if
12:         if γ |M| > |B| or D = D_max then                   ▷ Sufficient reduction in background for NB
13:             Train Navie Bayes with M and B.
14:             if Precision < λ and D = D_max then
15:                 return Negative leaf
16:             else if Precision ≥ λ then
17:                 return Naive Bayes node
18:             end if
19:         end if
20:     end if
21:     Find w_max, the most prevalent word in M.
22:     Let M_{w_max} = {m_i : m_i ∈ M∧w_max ∈ m_i}, B_{w_max} = {m_i : m_i ∈ B∧w_max ∈ m_i}
23:     Let B¬_{w_max} = B \ B_{w_max}, M¬_{w_max} = M \ M_{w_max}
24:     Present child = BUILD_BFNB_NODE(M_{w_max},B_{w_max},D+1)
25:     Absent child = BUILD_BFNB_NODE(M¬_{w_max},B¬_{w_max},D)
26: end function
```

For each meme identified by meme detector 15, a corresponding classifier is trained by meme classifier 61 and, in turn, stored as part of a classification bank 91 in a tracking database 93. Classification bank 91 is then applied to the continuous, high volume media stream 13 of incoming posts by meme associator 63 to identify any new posts relating to the detected memes.

Any new posts in media stream 13 that relate to a previously detected meme are identified by associator 63 using its corresponding meme classifier stored in bank 91. The new associated posts are then compiled and grouped with the previously identified posts from the trigger set to form a final output set of posts 19, which is preferably stored in as a corresponding table in database 29 or other storage mechanism (not shown), the final output set of posts 19 being preferably linked with its associated normalcy table 27 in database 29 (alongside the previous trigger set). In addition, at designated intervals, each classifier in meme classification bank 91 can be retrained using the augmented set of posts in the modified trigger set. In this capacity, each meme can be tracked and redefined, as needed, to ensure that all relevant posts associated with a meme are located and collected.

Lastly, when the number of posts in media stream 13 that relate to a classified meme falls below a certain threshold over a specified period of time, the meme is considered no longer timely. Consequently, the classifier associated with the meme is removed from classification bank 91 and, as such, is no longer tracked.

The embodiment shown above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A system for discovering internet memes from a social media stream generating a plurality of posts, each post comprising at least one term, the system comprising:
   (a) a meme detector for grouping together a first set of posts from the social media stream, each of the posts in the first set including at least one common term, the meme detector characterizing the first set of posts as an internet meme using the at least one common term; and
   (b) a meme tracker for classifying the internet meme, the meme tracker continuously monitoring posts from the social media stream and associating additional posts related to the internet meme with the first set of posts to yield a combined set of posts for the internet meme;
   (c) wherein the meme detector includes a normalcy model that compiles historical data relating to the use of the at least one common term in the plurality of posts from the social media stream over a defined period of time, the historical data being stored as a normalcy table, the meme detector characterizing the first set of posts as an internet meme if use of the at least one common term exceeds use of the at least one common term in the normalcy table by a predefined threshold.

2. The system as claimed in claim 1 wherein each of the first set of posts includes one or more anomalous bigrams.

3. The system as claimed in claim 2 wherein the meme detector characterizes the first set of posts as an internet meme by creating a weighted undirected graph using the one or more anomalous bigrams from the first set of posts.

4. The system as claimed in claim 3 wherein the meme detector characterizes the first set of posts by identifying a trigram with the highest count from the weighted undirected graph.

5. The system as claimed in claim 1 wherein the meme tracker classifies the internet meme using first and second level classifiers designed for high speed and precision.

6. The system as claimed in claim 5 wherein the first level classifier filters out a majority of the plurality of posts from the media stream to yield a first subset of posts.

7. The system as claimed in claim 6 wherein the first level classifier is a decision tree classifier.

8. The system as claimed in claim 6 wherein the second level classifier compares features in the first subset of posts in order to classify the internet meme.

9. The system as claimed in claim 8 wherein the second level classifier is a Naive Bayes classifier.

10. The system as claimed in claim 1 wherein the meme tracker continuously monitors the plurality of posts from the social media stream in view of the classified internet meme.

11. The system as claimed in claim 10 wherein the meme tracker periodically associates new posts from the social media stream that relate to the classified internet meme with the first set of posts to yield the combined set of posts for the internet meme.

* * * * *